(12) United States Patent
Giese et al.

(10) Patent No.: US 6,825,871 B2
(45) Date of Patent: Nov. 30, 2004

(54) FILM REGISTRATION MECHANISM IN AN INTERNAL DRUM SCANNER

(75) Inventors: Troy A. Giese, Hugo, MN (US); James R. Gilbertson, Plymouth, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/377,051

(22) Filed: Feb. 28, 2003

(65) Prior Publication Data

US 2004/0169720 A1 Sep. 2, 2004

(51) Int. Cl.[7] ................................................ B41J 2/435
(52) U.S. Cl. ...................................... 347/262; 347/264
(58) Field of Search ............................... 347/262, 264, 347/171; 271/226, 230, 234; 358/494

(56) References Cited

U.S. PATENT DOCUMENTS

| | | | |
|---|---|---|---|
| 4,750,045 A | * | 6/1988 | Ohara et al. ................. 358/494 |
| 5,956,071 A | | 9/1999 | Mattila et al. ............... 347/262 |
| 6,271,871 B1 | * | 8/2001 | Rombult et al. ............. 347/171 |
| 6,342,914 B1 | * | 1/2002 | Johnson et al. ............. 347/262 |

* cited by examiner

Primary Examiner—Hai Pham
(74) Attorney, Agent, or Firm—William F. Noval

(57) ABSTRACT

An apparatus for registering film in a drum scanner assembly including: a horizontally oriented concave curved film platen having first and second horizontal edge regions and third and fourth curved side edge regions connected between first and second edge regions, the concave, curved film platen having a curved surface defining a curved film path from the first edge region to the second edge region; a plurality of slider assemblies having film engagement members mounted relative to the platen to engage film fed into the film platen, the film engagement members being independently slidable within the slider assemblies; and means for simultaneously moving the slider assemblies according to the size of film to be fed onto the film platen such that all of the film engagement members are aligned across the platen in a direction perpendicular to the film path; wherein as film is fed onto the film platen from the first edge region along the curved film path toward the second edge region, the leading edge of the film engages the film engagement members to move the members along the slider assemblies until the film is registered on the platen, the film being de-skewed during the movement.

9 Claims, 16 Drawing Sheets

FILM REGISTRATION MECHANISM IN AN INTERNAL DRUM SCANNER

FIELD OF THE INVENTION

This invention relates in general to internal drum scanner assemblies and laser imaging systems incorporating such scanner assemblies. In particular, the present invention relates to a mechanism for aligning film into a scanning position in an internal drum type scanner assembly, suitable for use in a medical imaging system.

BACKGROUND OF THE INVENTION

Laser imaging systems are commonly used to produce photographic images from digital image data generated by magnetic resonance (MR), computed tomography (CT) or other types of medical image scanners. Systems of this type typically include a continuous tone laser imager for exposing the image on photosensitive film, a film processor for developing the film, and control subsystems for coordinating the operation of the laser imager and the film processor.

The digital image data is a sequence of digital image values representative of the scanned image. Image processing electronics within the control subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors) for exposure of the image onto the film. The linear translation system provides for movement of the laser scanning system in a direction perpendicular to the scanning direction, such that a full image may be scanned on a piece of photosensitive film.

In an internal drum type laser scanner assembly, a piece of film is positioned onto a film platen, wherein the film platen has a partial cylindrical or partial drum shape. The photosensitive film is positioned against the film platen. The laser or optical scanning system is positioned at the center of curvature of the photosensitive film for scanning a scan line across the photosensitive film surface. A linear translation system moves the laser or optical scanning system lengthwise along a longitudinal axis as defined by the center of curvature of the film to expose an entire image onto the film.

The film may be fed onto the film platen utilizing a film transport system which often incorporates a plurality of feed rollers. Once the piece of photosensitive film is fed onto the film platen, the film must be held tight against the curved surface of the film platen, and centered and aligned into a scanning position in order for an image to be correctly exposed onto the photosensitive film. Any skew of the film must also be removed. Often such methods and mechanisms for aligning and centering a piece of film on the internal surface of the film platen require multiple complex mechanical and electrical components and control systems.

U.S. Pat. No. 5,956,071, issued Sep. 21, 1999, inventors Mattila et al., discloses an assembly for positioning a film into a scanning position on a curved film platen in an internal drum scanner assembly. The film platen is defined by a first curved edge, a second curved edge, a film feed edge, and a film stop edge. The assembly comprises a first slider block assembly and a second slider block assembly which is spaced from the first slider block assembly a distance less than the width of the leading edge of the photosensitive film. A feed mechanism is positioned proximate the film feed edge, for feeding a piece of photosensitive film having a leading edge along the curved film platen. The leading edge of the film is fed from a location proximate the film feed edge towards the film stop edge. When the photosensitive film is in the scanning position, the leading edge of the photosensitive film contacts the first slider assembly and the second slider assembly. The photosensitive film is tensioned against the curved film platen in alignment between the first slider assembly and the second slider assembly and the feed mechanism, thus removing any skew.

As disclosed in the previous patent, different film sizes are accommodated by a set of a first and second slider block assemblies being provided for each film size handled by the scanner assembly. The slider block assembly sets are spaced along the curved length of the platen since different film lengths wrap around the platen to varying degrees. Although useful for the purposes for which it was intended, this arrangement adds undesirable complexity in that it requires changing slider block assembly locations for each film size.

U.S. Patent No. 6,342,914, issued Jan. 29, 2002, inventors Johnson et al., discloses an apparatus for registering film in a drum scanner assembly including; a concave curved film platen having spaced first and second linear edges that are oriented horizontally and third and fourth curved side edges connected between the first and second edges, the concave, curved film platen having a curved surface defining a curved film path having a first downwardly curved position and a second upwardly curved position from the first to the second edges, first and second spaced film engagement assemblies independently and movably mounted relative to the platen at the second portion of the film path, the assemblies having film registration slides for engaging the leading edge of a sheet of film fed onto the concave, curved film platen from the first edge and along the curved film path the slides being mounted for movement over substantially the length of the second portion of the path and being adapted to register films of different lengths; and device associated with the slides for biasing the slides through the force of gravity against the leading edge of the film, wherein as the film is fed along the curved path, the slides are moved upwardly by the film against the force of gravity wherein the film is caused to conform to the curved film platen and wherein the independently mounted slides act to remove skew from the fed film.

There is thus a need in an internal drum type laser scanner assembly to provide a system for properly registering and deskewing multiple size films that is reliable, low in cost and simple in design.

SUMMARY OF THE INVENTION

According to the present invention, there is provided a solution to these problems.

According to a feature of the present invention, there is provided an apparatus for registering film in a drum scanner assembly comprising: a horizontally oriented concave curved film platen having first and second horizontal edge regions and third and fourth curved side edge regions connected between said first and second edge regions, said concave, curved film platen having a curved surface defining a curved film path from said first edge region to said second edge region; a plurality of slider assemblies having film engagement members mounted relative to said platen to engage film fed into said film platen, said film engagement members being independently slidable within said slider assemblies; and means for simultaneously moving said slider assemblies according to the size of film to be fed onto said film platen such that all of said film engagement members are aligned across said platen in a direction perpendicular to said film path; wherein as film is fed onto said film platen from said first edge region along said curved film path toward said second edge region, the leading edge of said film engages said film engagement members to move the members along the slider assemblies until the film is registered on the platen, the film being deskewed during said movement.

ADVANTAGEOUS EFFECT OF THE INVENTION The invention has the following advantages:

1. A system for properly registering and deskewing multiple size films that is reliable, low in cost, simple in design and small in size for incorporation in a small diameter internal drum platen.

DETAILED DESCRIPTION OF THE INVENTION

The purpose of the present invention is to engage the leading edge of film entering a platen and to force the film to conform to the platen surface while the independent tabs remove skew. Since one known laser imager only images one film size, the platen uses spring-loaded tabs with a limited range of motion. Another known laser imager images two film sizes, and uses gravity slides to apply the force to the leading edge of the film. Neither of these methods is appropriate where multiple film sizes are required and the smallest would require anti-gravity (since it is uphill on the film entrance side of the platen).

Figure 1:
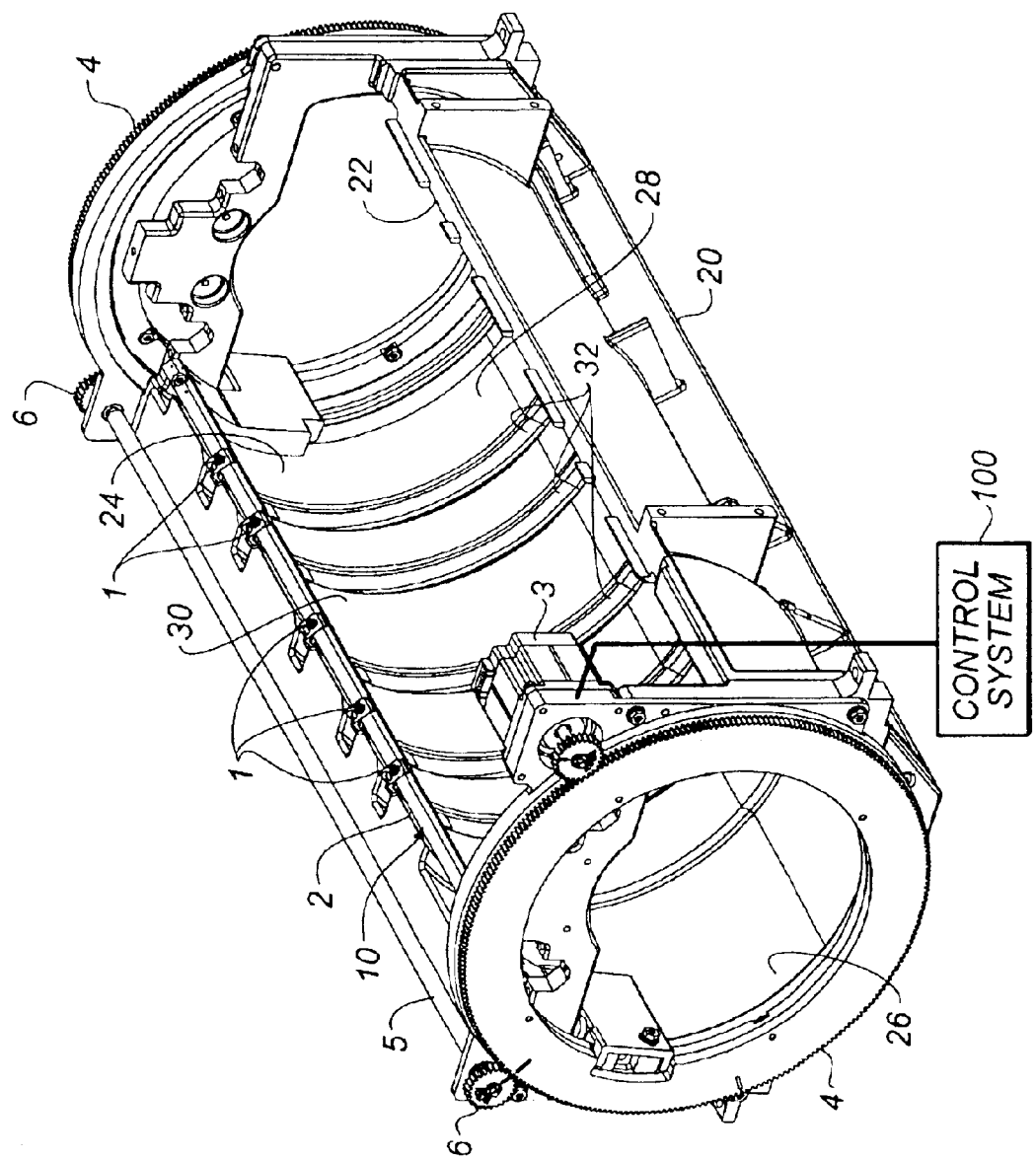
FIG. 1 are a rear isometric views of the present invention on an imaging cylinder.

FIG. 1 is a rear isometric view of an embodiment of the present invention including a film platen 20 and platen registration bar assembly 10, a bar 2 attached to a pair of large gears 4 and five independently spring-loaded sliders 1. A geared motor 3 actuated by control system 100 locates the bar by rotating the large gears, synchronized with a pair of gears 6 attached to a rod 5. Assembly 10 is able to deskew films ranging in lengths from 18 cm. to 43 cm. in widths of both 25 cm. and 36 cm. Previous designs would handle either one film size or not all the required film lengths.

Assembly 10 is mounted for movement on a horizontally oriented concave curved film platen 20 having first and second horizontal edge regions 22, 24 and third and fourth curved side regions 26, 28 connected between said first and second edge regions 22, 24. The concave, curved film platen has a curved surface 30 defining a film path from first edge region 22 to second edge region 24. Platen 20 is preferably cast aluminum and has arcuate slots 32 in which said sliders 1 are slidably mounted.

Figure 2A:
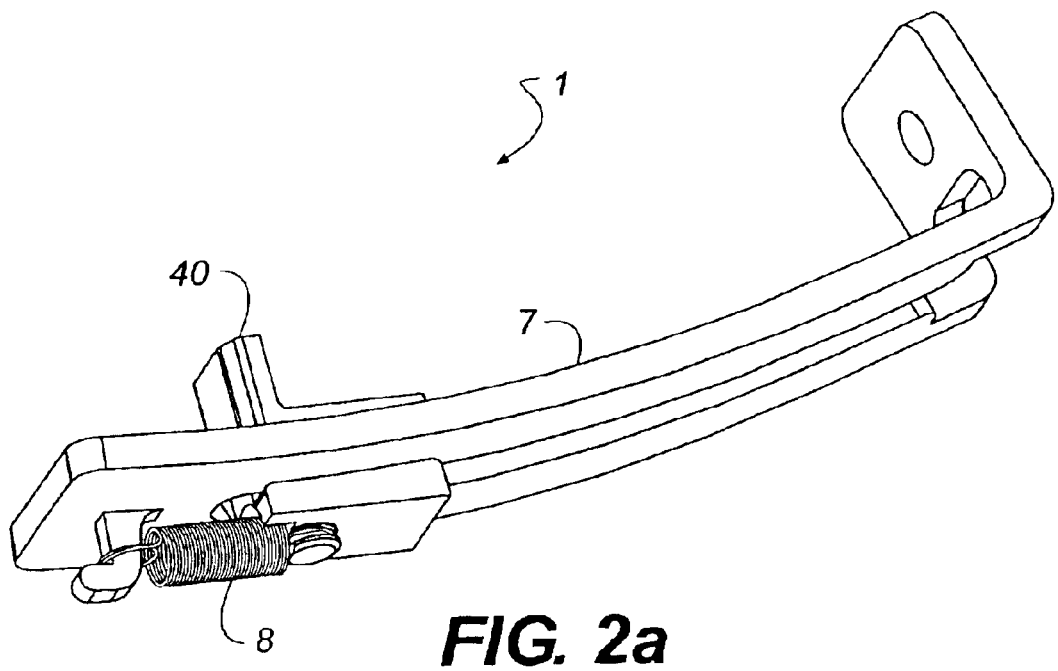
FIGS. 2a–2d are an isometric view of a spring-loaded slider assembly.
Figure 2B:
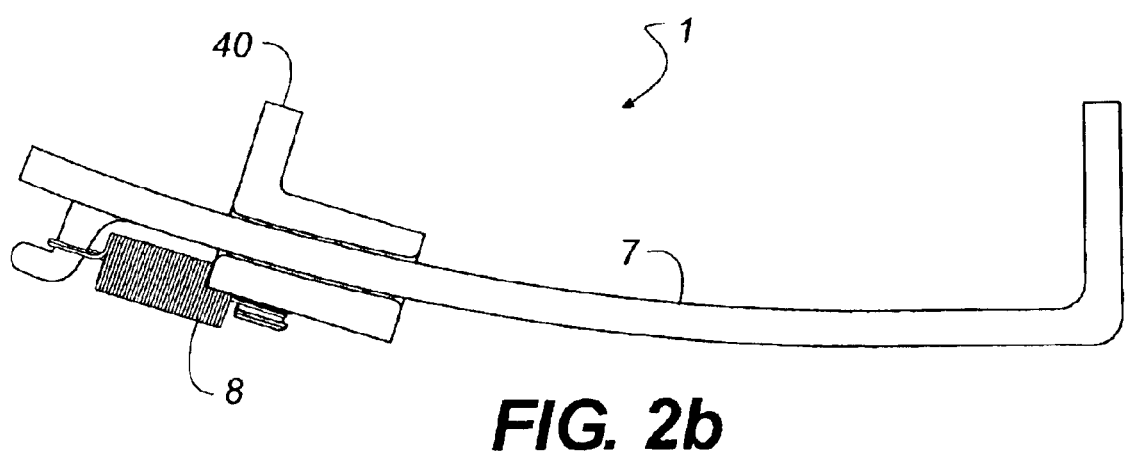
Figure 2C:
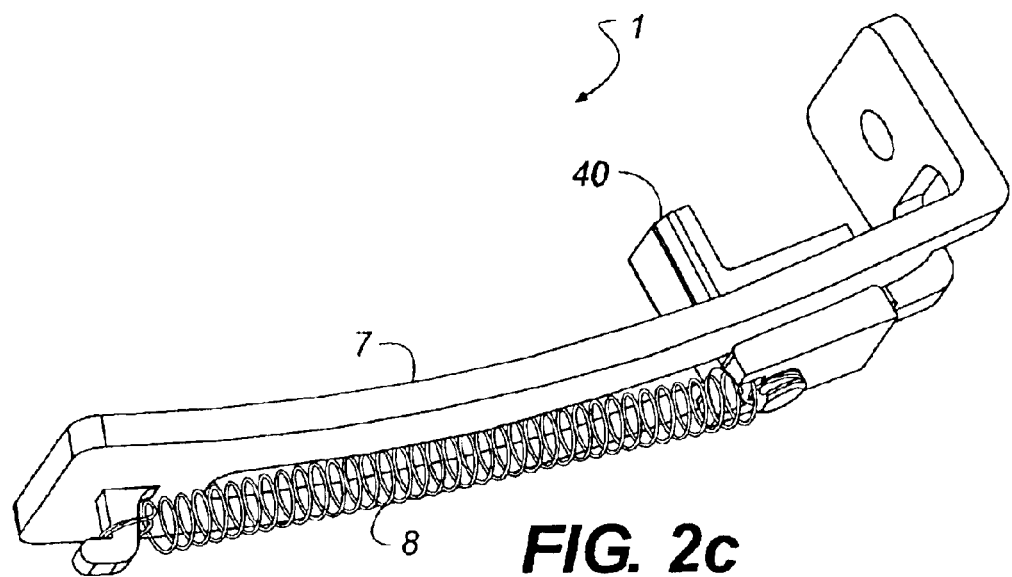
Figure 2D:
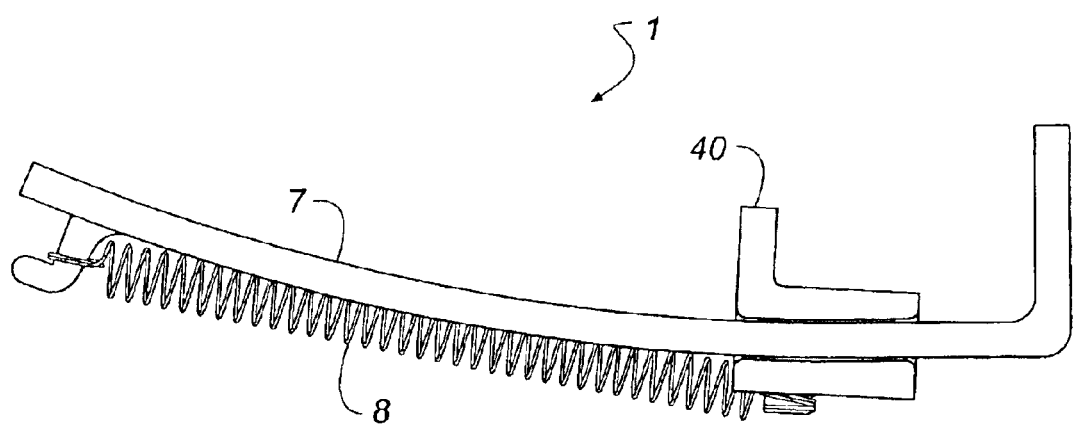

As shown in FIGS. 2a–2b, the slider 1 includes a film engagement member 40 which travels along the curved guide 7 and is spring-loaded with an extension spring 8. FIGS. 2a and 2b show spring 8 unextended and FIGS. 2c and 2d show spring 8 extended.

Figure 3:
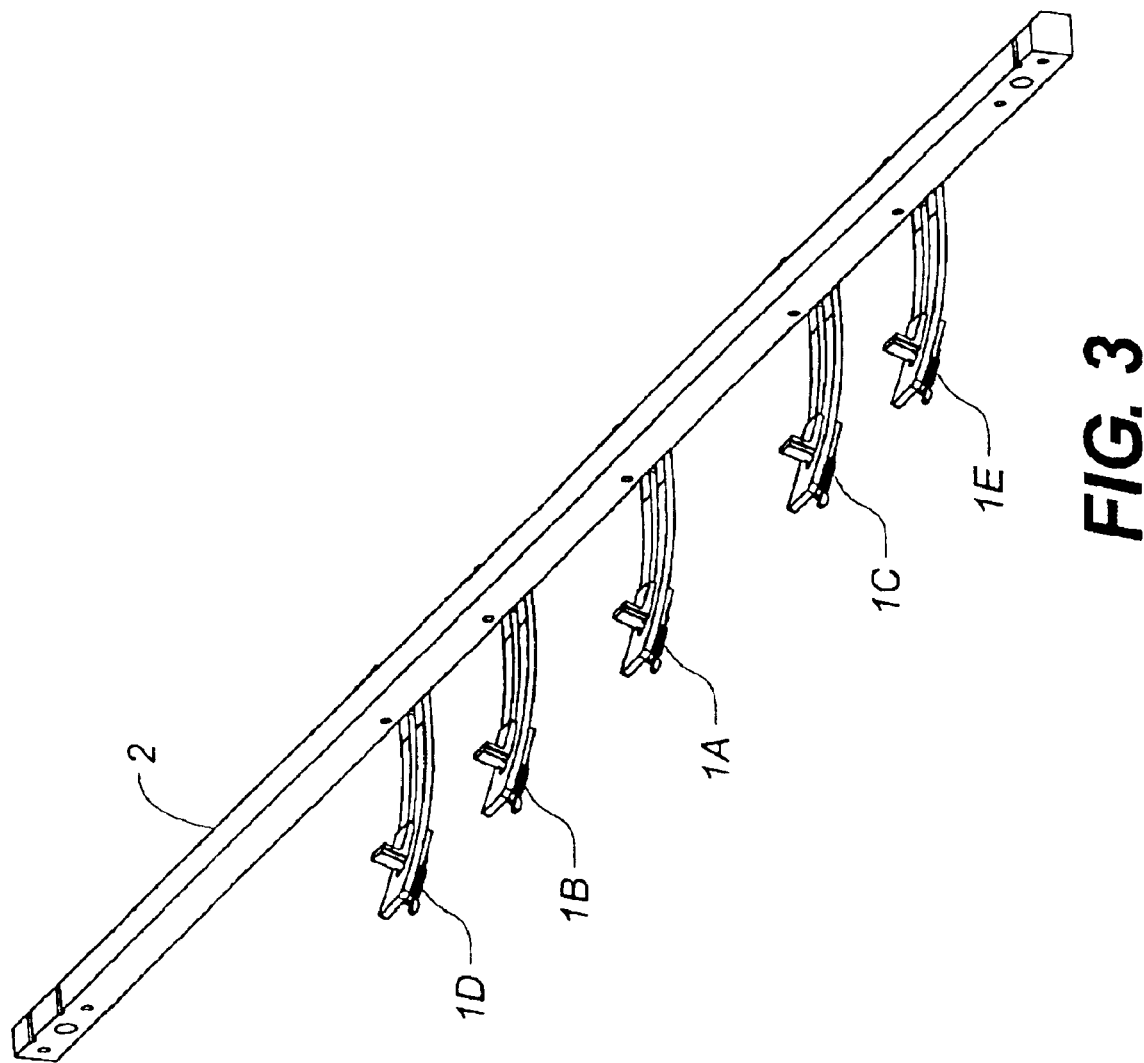
FIG. 3 is a front isometric view of the spring-loaded slider assemblies attached to the registration bar.

Attaching the sliders 1A–1E to a movable bar (member) 2, as shown in FIG. 3, allows the mechanism to accommodate any film size within the range of the motion of the bar 2. The use of five sliders 1A–1E insures that a minimum of three sliders will interface with each film width (center and near both corners). Although sliders 1A–1E mechanism located in the center will deskew the film, three are required to insure that the film conforms to the surface of the curved platen.

Figure 4A:
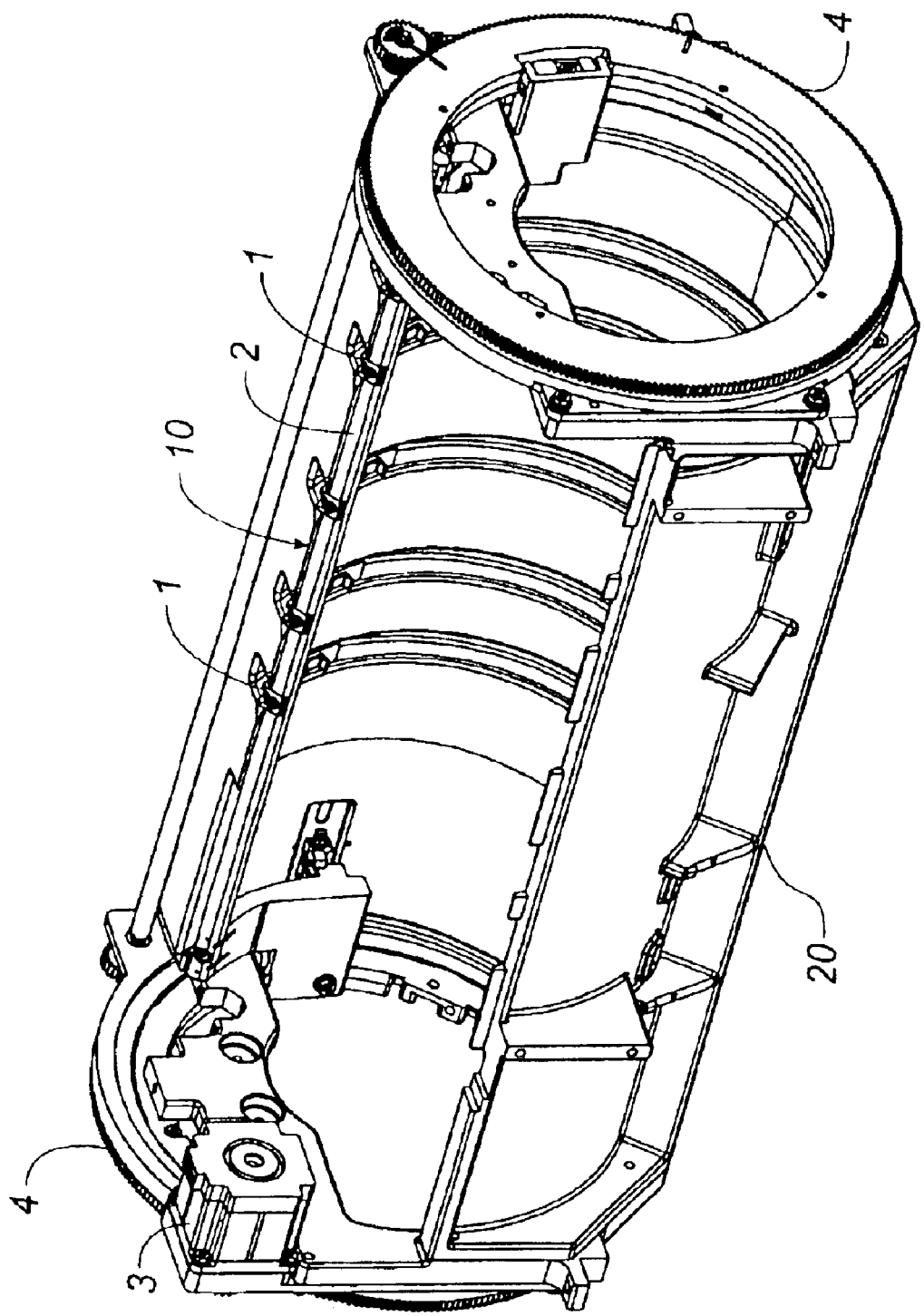
FIGS. 4a–4d are diagrammatic views showing the sequence of operation for the present invention registering a 36 cm.×36 cm. film.
Figure 4B:
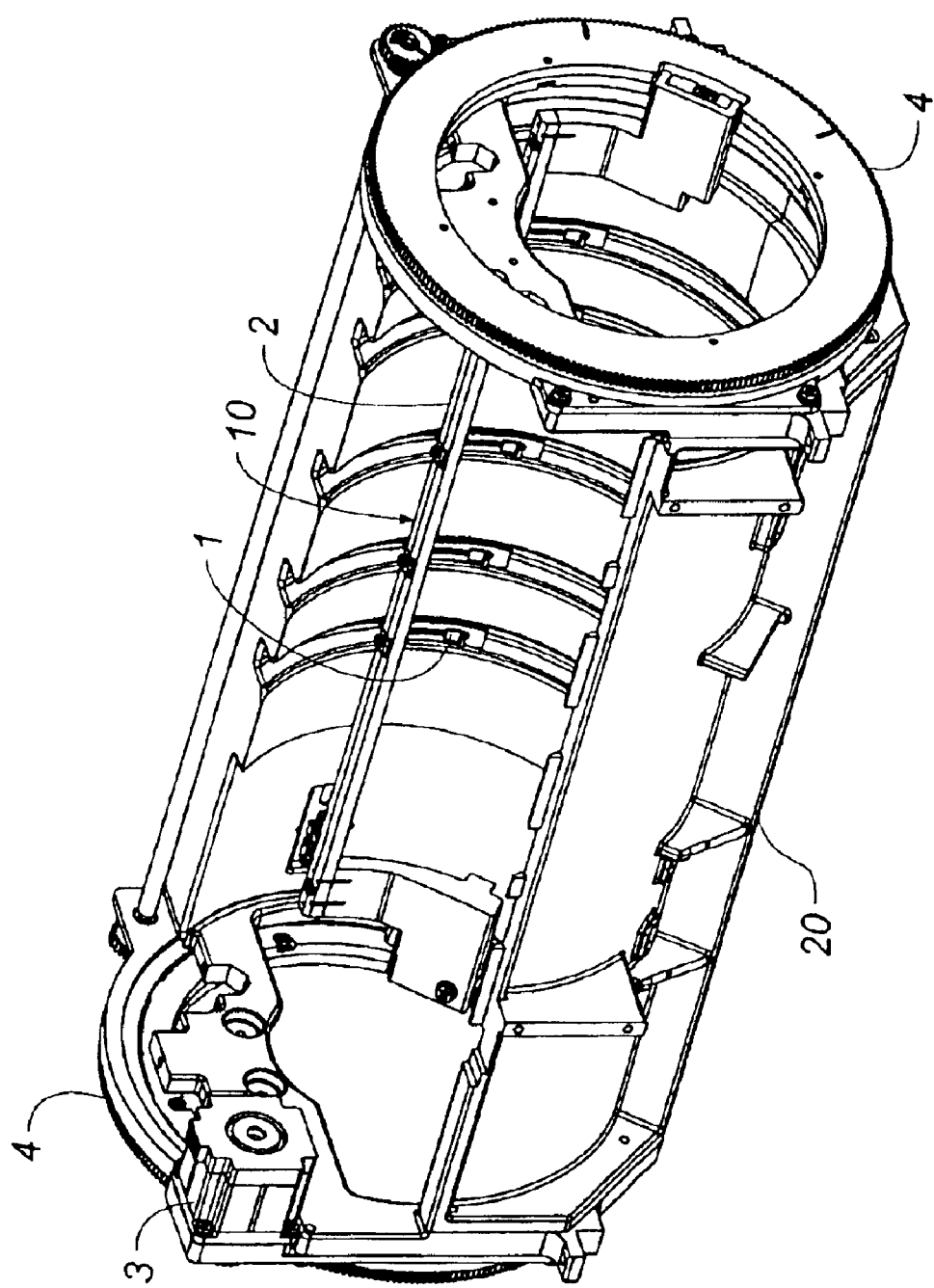

The platen registration bar assembly 10 operates using one rotational stepper motor 3 to position the sliders 1A–1E attached to the movable bar 2 via the gear train and one sensor to detect the home position. The sequence of operations begins with input from software indicating the length of the film approaching the platen. The rotational stepper motor turns the gear train to position the sliders in the correct position. FIGS. 4a–4d show the sequence of operation of the assembly 10 for registering a 36 cm.×36 cm. film. The film registration bar 2 moves from a previous location shown in FIG. 4a to the location as shown in FIG. 4b.

Figure 4C:
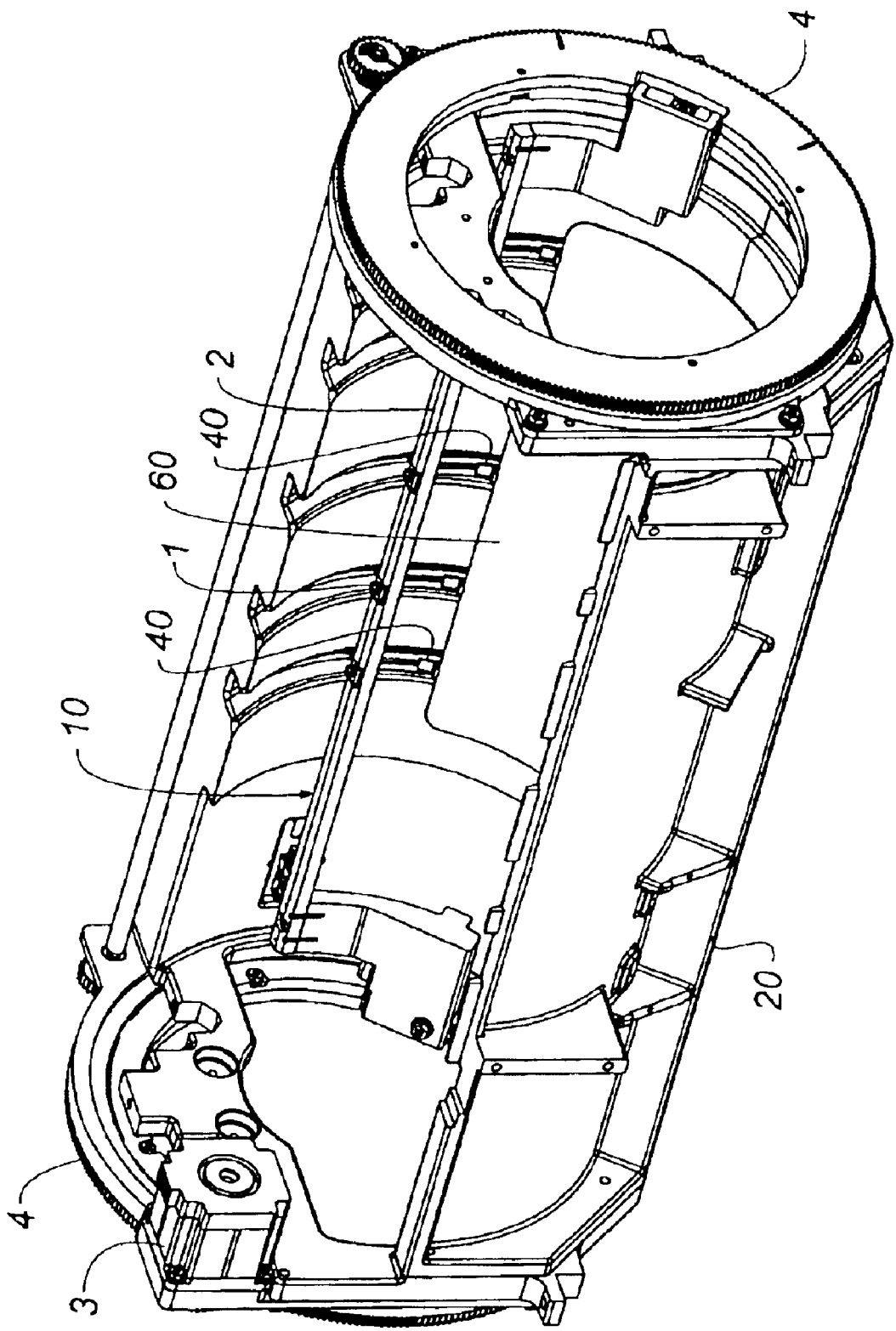
Figure 4D:
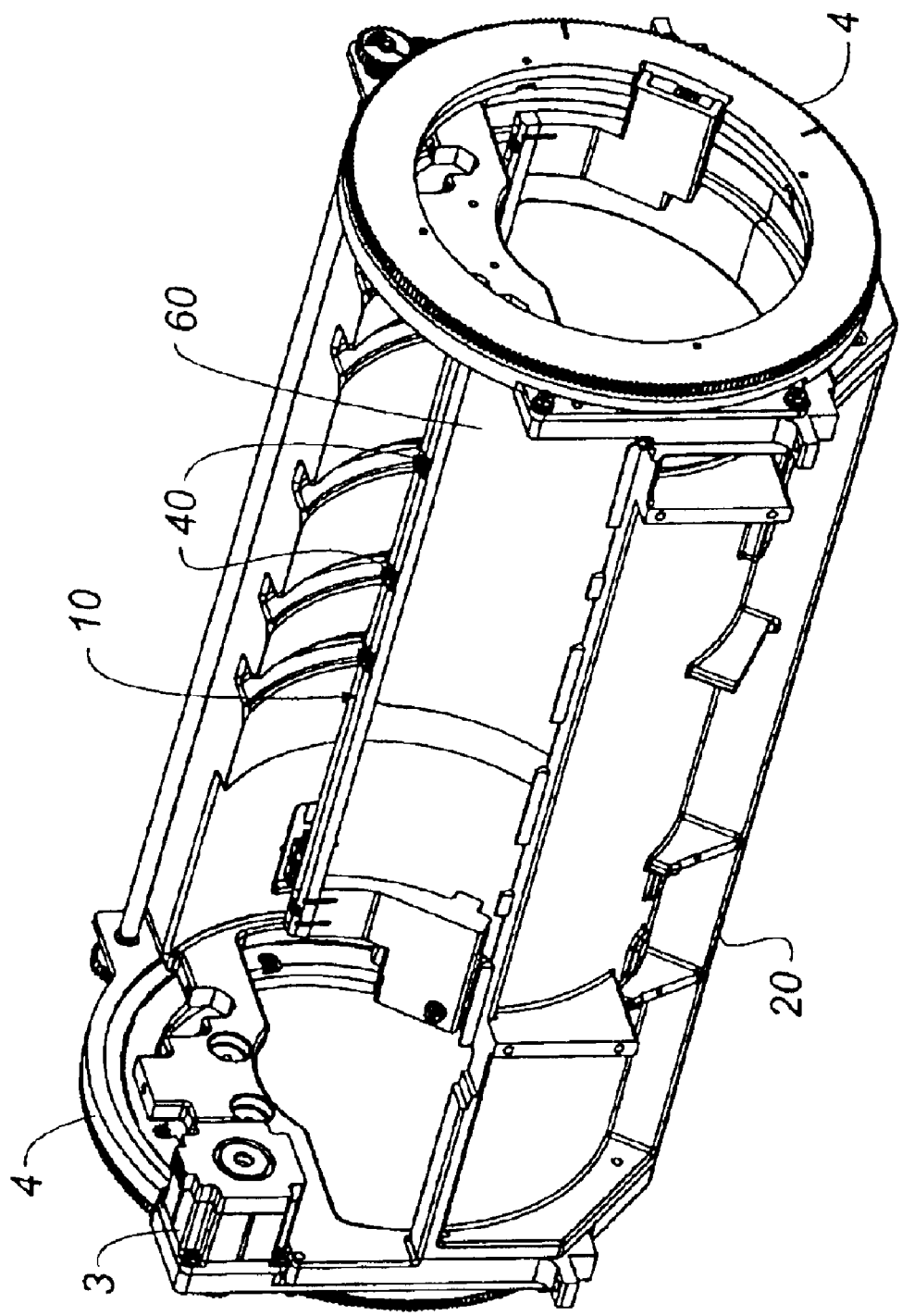

As shown in FIGS. 4c–4d, the film 60 enters the platen 20 and engages the film engagement members 40 of the spring-loaded sliders 1A–1E. The sliders move along the curved guides 7 until the film is registered in the platen 20.

Figure 5A:
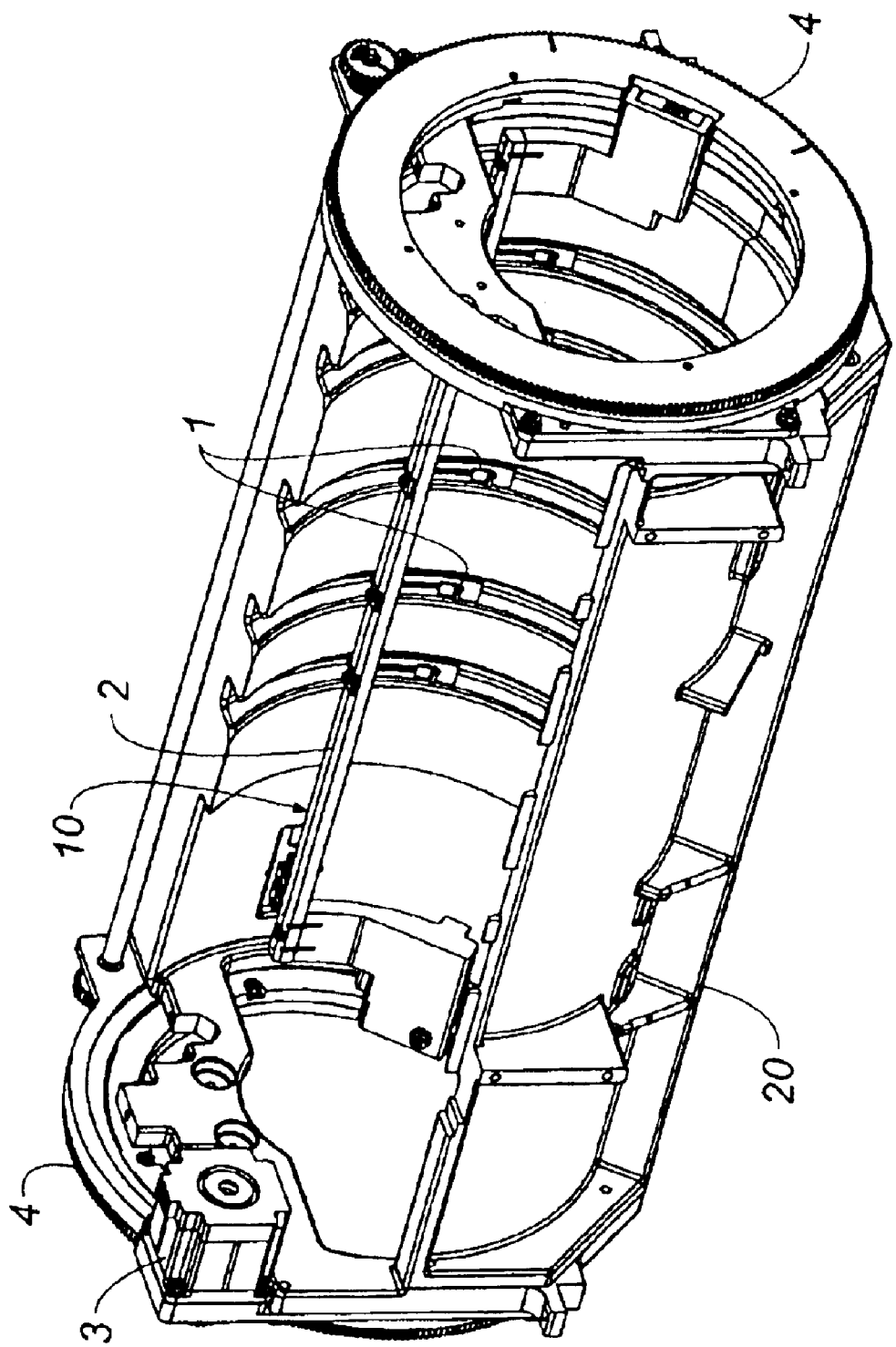
FIGS. 5a–5d are diagrammatic views showing the sequence of operation for the present invention registering a 36 cm×43 cm film.
Figure 5B:
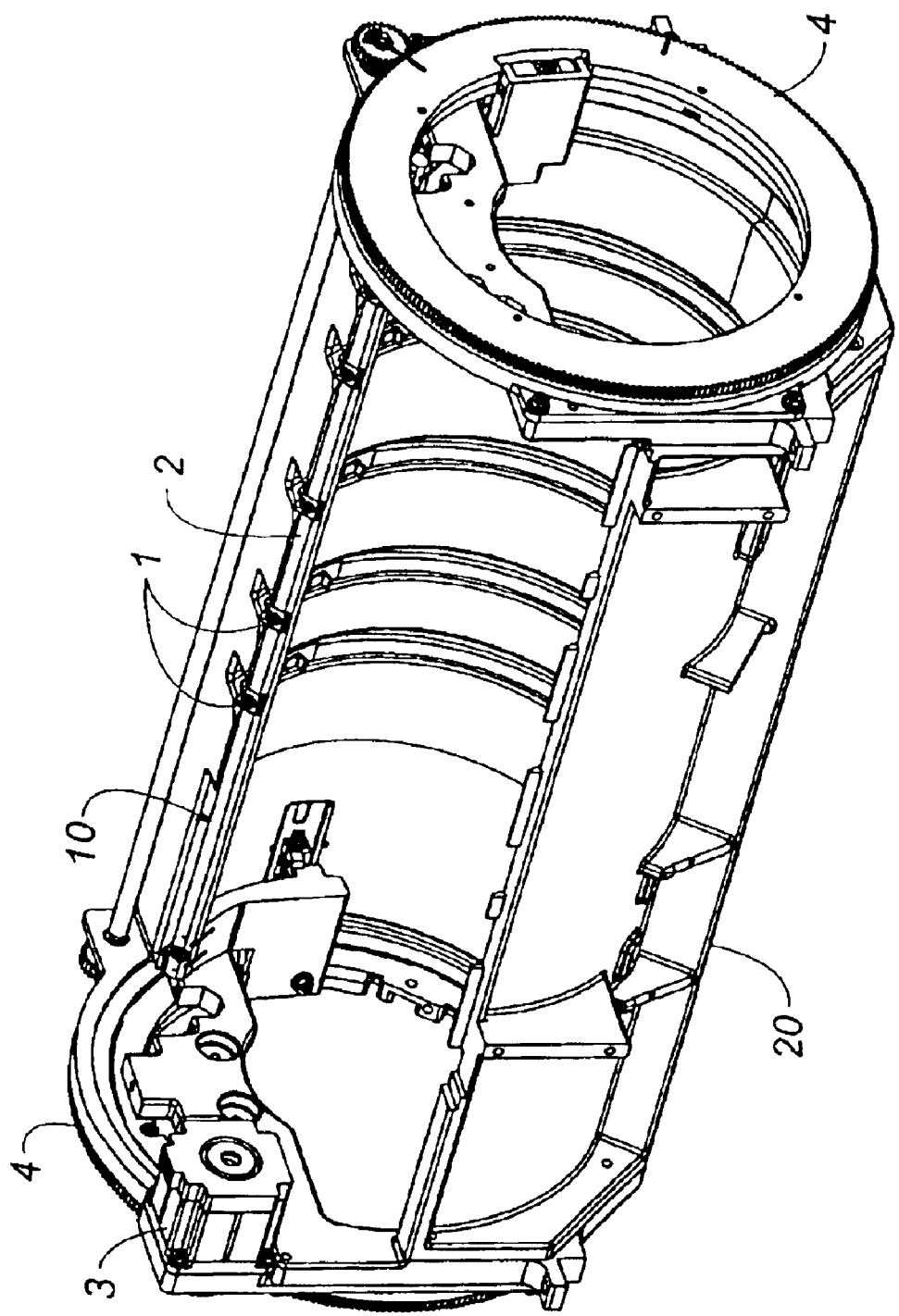
Figure 5C:
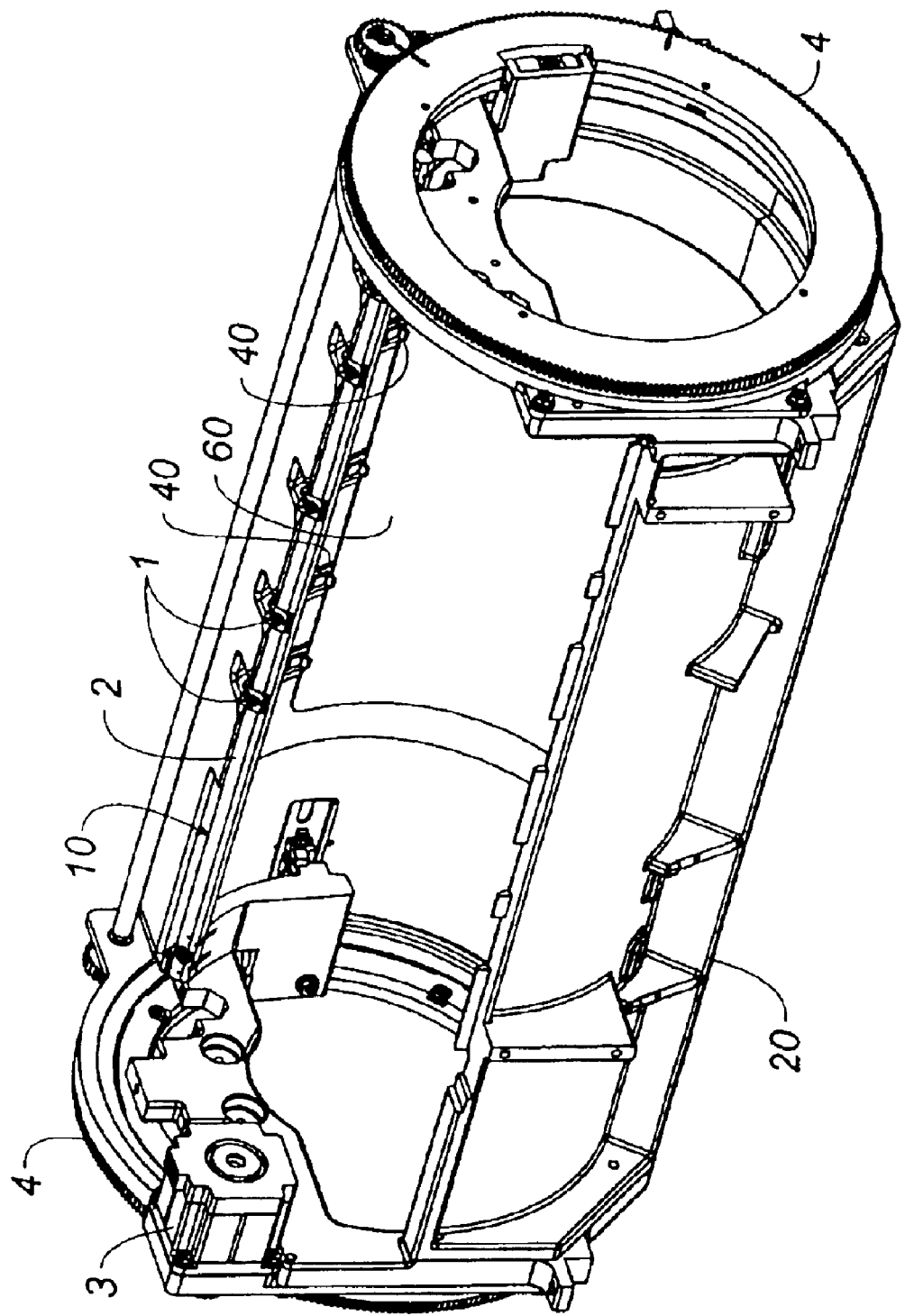
Figure 5D:
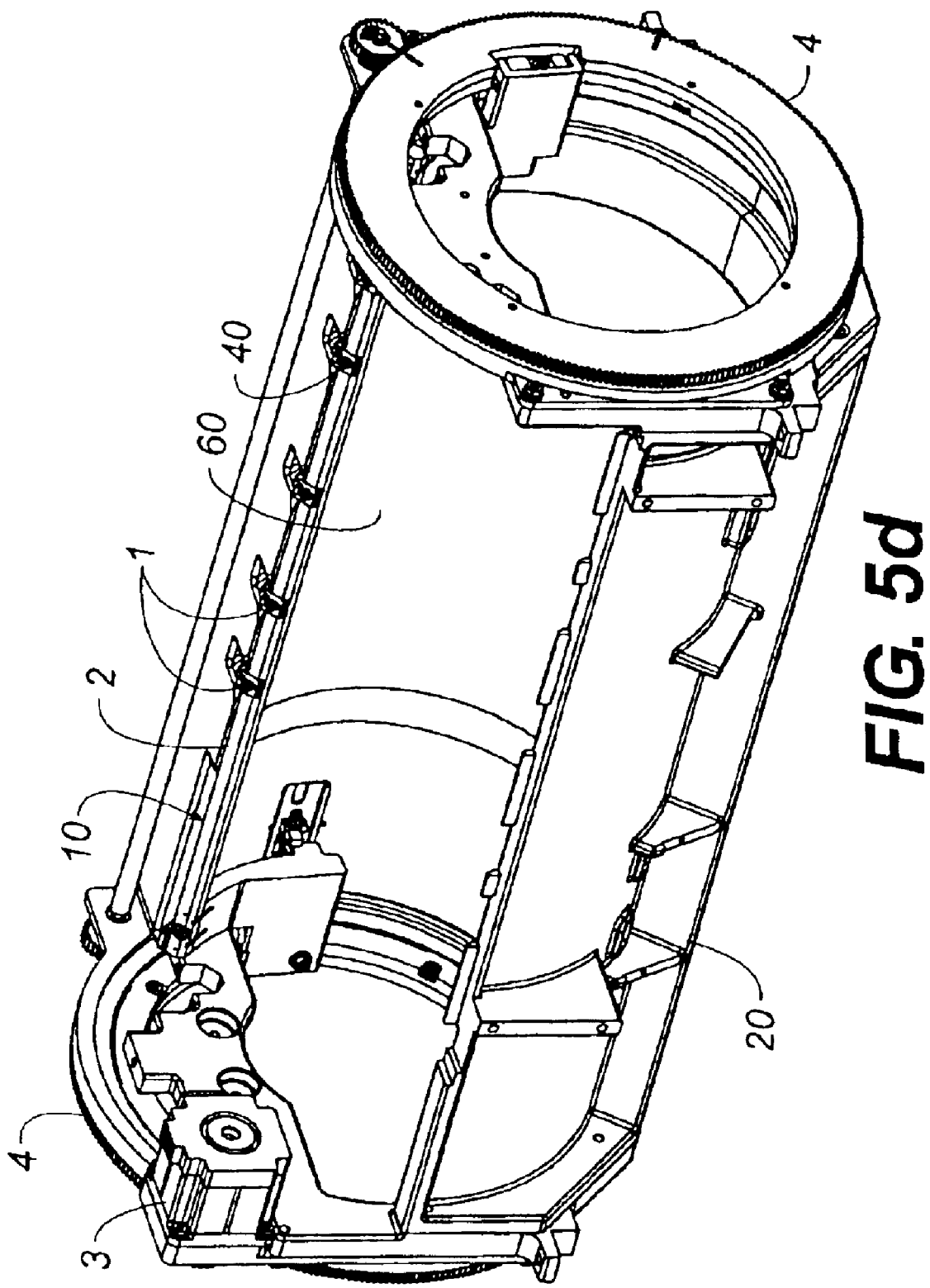

FIGS. 5a–5d shows the sequence of operation of the assembly 10 for registering a 36 cm.×43 cm. film. The film registration bar 2 moves from a previous location shown in FIG. 5a to the location required as shown in FIG. 5b. As shown in FIGS. 5c–5d, the film 60 enters the platen and engages the film engagement members 40 of the spring-loaded sliders 1A–1E. The members 40 move along the curved guides 7 until the film 60 is registered in the platen 20 (FIG. 5d). Other film sizes follow the above procedure with the variable being the position of the registration bar 2.

Figure 6A:
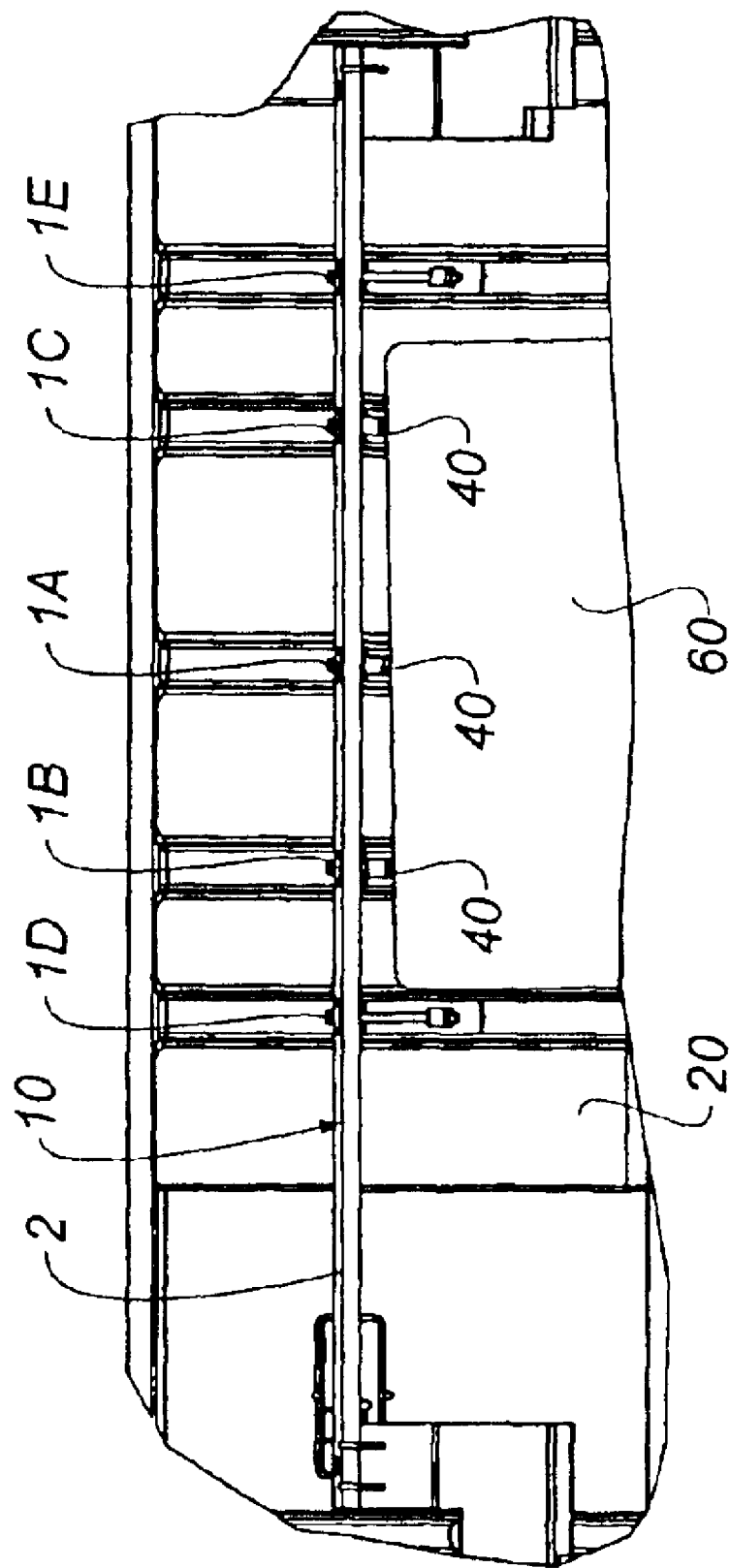
FIGS. 6a–6b are diagrammatic views showing operation for the present invention deskewing a 25 cm. wide film.
Figure 6B:
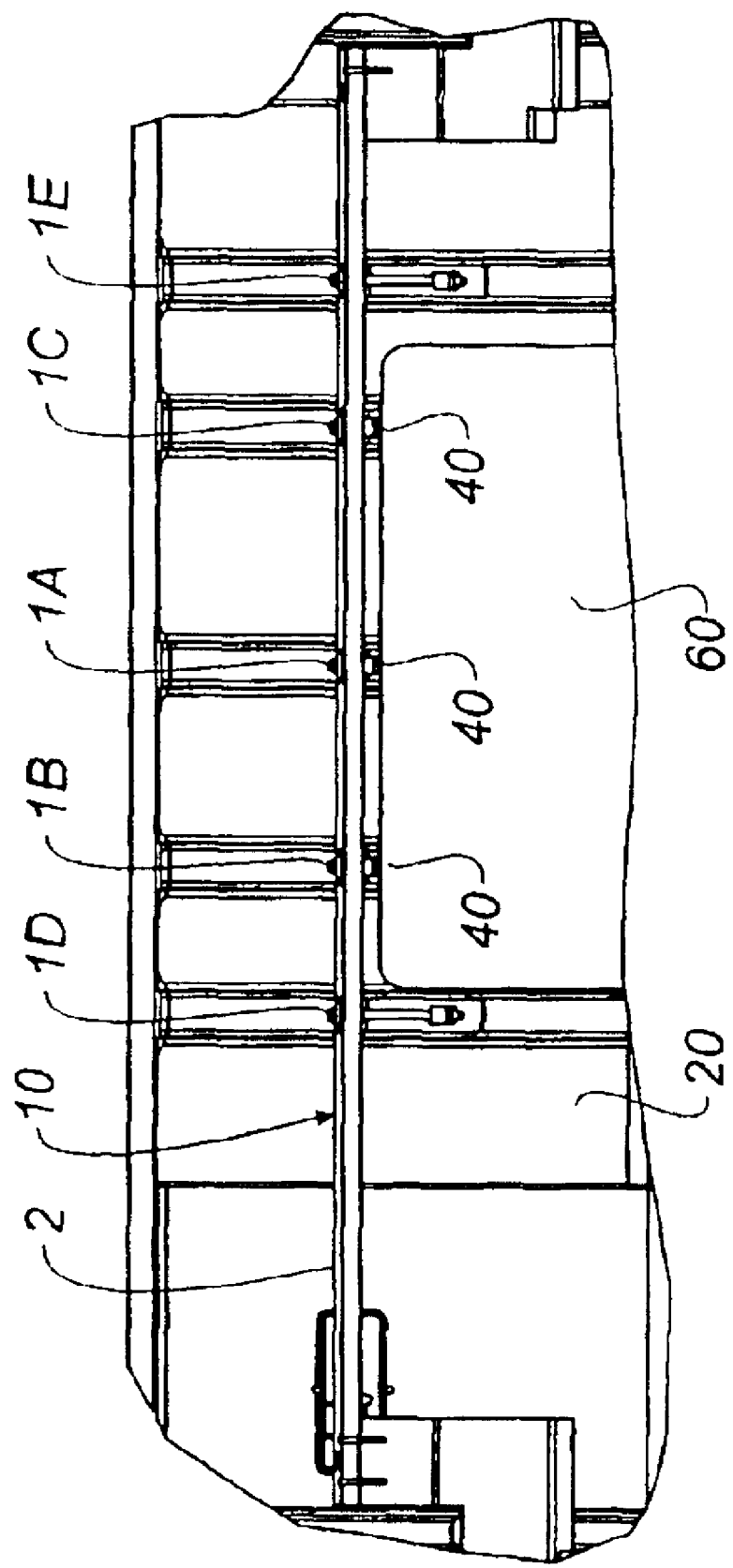

FIGS. 6a–6b show a 25 cm. wide film 60 being deskewed by the spring-loaded sliders 1A–1C. A skewed film 60 enters the platen 20 and engages the spring-loaded members 40 of sliders 1A–1C. The members 40 have additional travel available to accommodate the extended reach of the leading corner. The two exterior sliders 1D–1E are unused for the 25 cm. wide films.

Figure 7A:
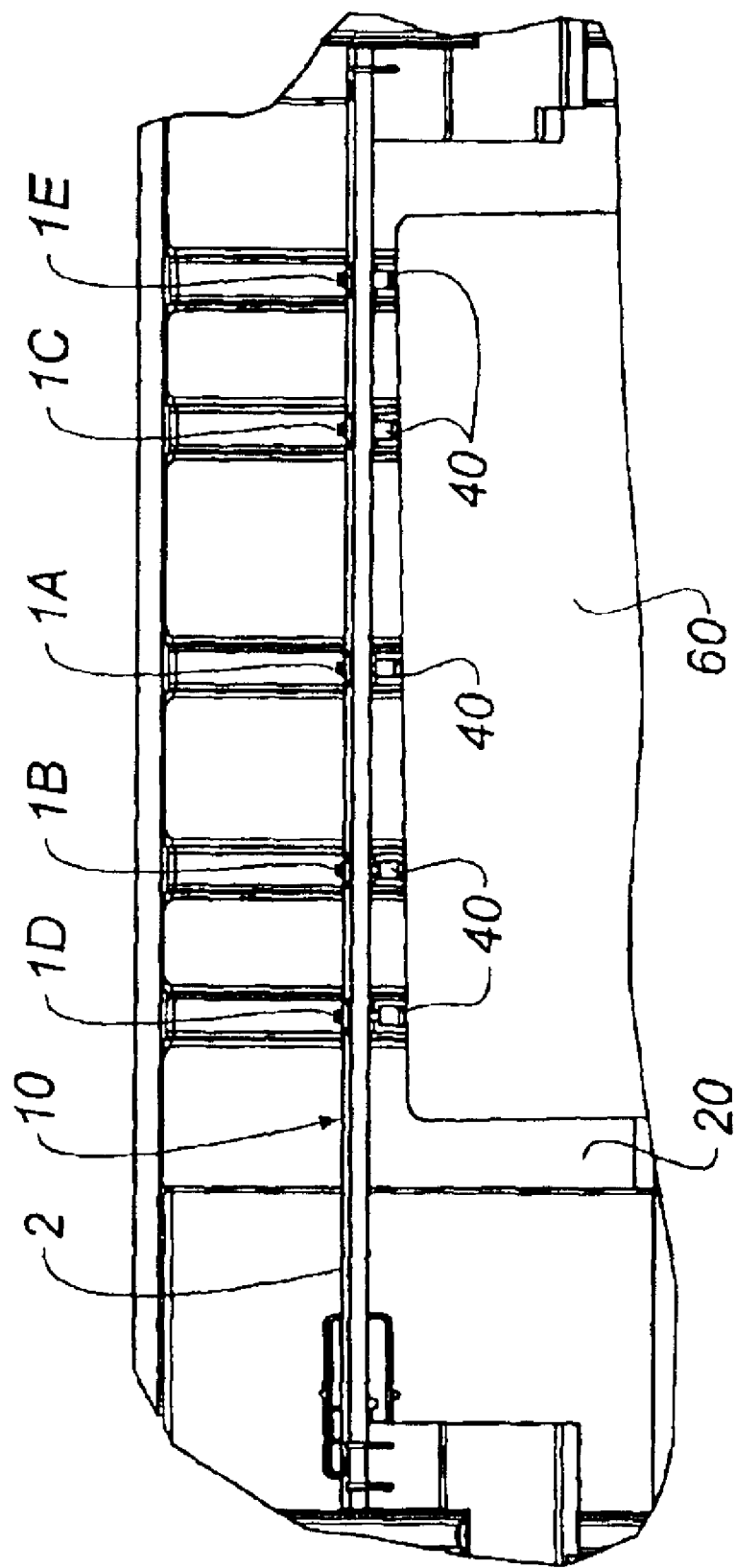
FIGS. 7a–7b are diagrammatic views showing operation for the present invention deskewing a 36 cm. wide film.
Figure 7B:
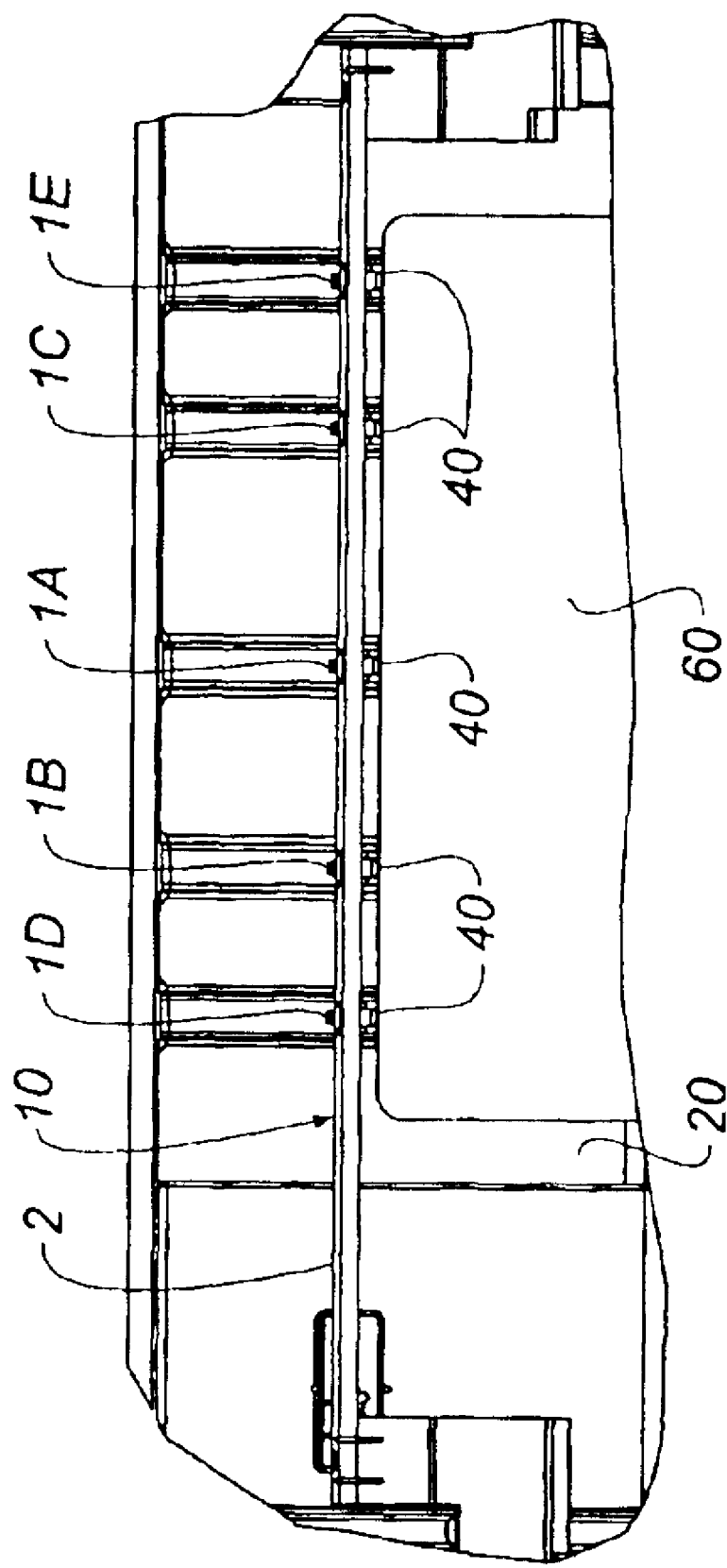

FIGS. 7a–7b show a 36 cm. wide film being deskewed by the spring-loaded sliders. A skewed film 60 enters the platen 20 and engages the spring-loaded sliders 1A–1E. The operation is the same as for 25 cm. wide film, with the exception that film engagement member 40 of all five sliders 1A–1E engage the leading edge of the film 60.

More or less than five sliders can be used and other means can be used to move platen registration bar assembly 10. In addition, other imaging media can be used in place of said film.

The invention has been described in detail with particular reference to certain preferred embodiments thereof, but it will be understood that variations and modifications can be effected within the spirit and scope of the invention.

Parts List

1 sliders
2 registration bar
3 rotational stepper motor
4 large gears
5 rod
6 pair of gears
7 guides
8 extension spring
10 bar assembly
20 film platen
22,24 first and second edge regions
26,28 third and fourth side regions
30 curved surface
32 arcuate slots
40 film engagement member
60 film
100 control system

What is claimed is:

1. An apparatus for registering film in a drum scanner assembly comprising:
   a horizontally oriented concave curved film platen having first and second horizontal edge regions and third and fourth curved side edge regions connected between said first and second edge regions, said concave, curved film platen having a curved surface defining a curved film path from said first edge region to said second edge region;
   a plurality of slider assemblies having film engagement members mounted relative to said platen to engage film fed into said film platen, said film engagement members being independently slidable within said slider assemblies; wherein said plurality of slider assemblies include a first set having film engagement members for engaging a first film of a first crosswise dimension and a second set cooperating with said first set and having film engagement members for engaging a second film of a second crosswise dimension greater than said first crosswise dimension of said first film; and
   means for simultaneously moving said slider assemblies according to the size of film to be fed onto said film platen such that all of said film engagement members are aligned across said platen in a direction perpendicular to said film path;
   wherein as film is fed onto said film platen from said first edge region along said curved film path toward said second edge region, the leading edge of said film engages said film engagement members to move the members along the slider assemblies until the film is registered on the platen, the film being de-skewed during said movement.

2. The apparatus of claim 1 wherein said each of plurality of slider assemblies includes a guide along which said film engagement member slides and a spring for biasing said film engagement member, and wherein said means for moving includes a registration member spanning the width of said platen, said plurality of slider assemblies being mounted by said registration member.

3. The apparatus of claim 2 wherein said registration member is mounted for rotation above said curved film platen, said film engagement members extending into said film path.

4. The apparatus of claim 3 including a motor and gear assembly for rotating said registration member.

5. The apparatus of claim 2 wherein said film platen has a plurality of slots corresponding to said plurality of slider assemblies and wherein said guides travel in said slots with said film engagement members extending above said slots into said film path.

6. The apparatus of claim 5 wherein said film platen is of cast aluminum and said slots are formed in said cast aluminum.

7. The apparatus of claim 1 wherein said means for moving moves said slider assemblies to at least first and second different positions along said film path to accommodate film of different dimensions along said film path.

8. An apparatus for registering film in a drum scanner assembly comprising:
   a horizontally oriented concave curved film platen having first and second horizontal edge regions and third and fourth curved side edge regions connected between said first and second edge regions, said concave, curved film platen having a curved surface defining a curved film path from said first edge region to said second edge region;
   a plurality of slider assemblies having film engagement members mounted relative to said platen to engage film fed into said film platen, said film engagement members being independently slidable within said slider assemblies; wherein said plurality of slider assemblies include a first centrally located assembly and second and third assemblies spaced outwardly from said first assembly for engaging a first film of a first crosswise dimension, greater than the spacing between said second and third assemblies and
   means for simultaneously moving said slider assemblies according to the size of film to be fed onto said film platen such that all of said film engagement members are aligned across said platen in a direction perpendicular to said film path;
   wherein as film is fed onto said film platen from said first edge region along said curved film path toward said second edge region, the leading edge of said film engages said film engagement members to move the members along the slider assemblies until the film is registered on the platen, the film being de-skewed during said movement.

9. The apparatus of claim 8 including fourth and fifth assemblies spaced outwardly from said second and third assemblies, the spacing between said fourth and fifth assemblies being greater than said first crosswise dimension of said first film but less than the crosswise dimension of a second film.

* * * * *